United States Patent [19]

Kuriyama

[11] Patent Number: 4,849,183

[45] Date of Patent: Jul. 18, 1989

[54] CONTINUOUS PHOTOCHEMICAL REACTOR

[75] Inventor: Akira Kuriyama, Osaka, Japan

[73] Assignee: Sunstar Giken Kabushiki Kaisha, Osaka, Japan

[21] Appl. No.: 90,516

[22] Filed: Aug. 28, 1987

[30] Foreign Application Priority Data

Aug. 29, 1986 [JP] Japan .................. 61-133597[U]

[51] Int. Cl.$^4$ .............................. C08- 17/00
[52] U.S. Cl. ................... 422/136; 422/186.3; 422/134; 422/138
[58] Field of Search ............ 422/136, 134, 138, 186.3

[56] References Cited

U.S. PATENT DOCUMENTS

| | | | |
|---|---|---|---|
| 3,476,669 | 11/1969 | Beckmann et al. | 422/186.3 X |
| 3,528,782 | 9/1970 | Riggert et al. | 422/136 |
| 3,544,522 | 8/1965 | Hahn | 422/136 X |
| 3,836,336 | 9/1974 | Yasui et al. | 422/134 |
| 3,844,915 | 10/1974 | Takamizawa et al. | 422/186.3 X |

OTHER PUBLICATIONS

Takayuki Ohtsu et al., "Device for Polymerization", *Experimental Method for Polymer Synthesis*, pp. 115–116, Kagaku Dojin Kabushikikaisha, 1972.

*Primary Examiner*—Michael S. Marcus
*Assistant Examiner*—Amalia L. Santiago
*Attorney, Agent, or Firm*—Wegner & Bretschneider

[57] ABSTRACT

A continuous photochemical reactor comprises a rotatable cylindrical reaction vessel provided at its one end with an inlet for reaction mixture and at the other end with an opening, a lid body for closing said opening of the reaction vessel and for discharging reaction products, a lamp mounted on the lid body and coaxially arranged in the reaction vessel, and a driving means for rotating the reaction vessel around its axis. The reaction vessel is provided at its inner wall with a spiral conveyer blade so that the inner edge of the blade is arranged close to the outer wall of the lamp. A reaction mixture is fed to the reactor through the driving shaft and irradiated by light such as ultraviolet light from the lamp while being conveyed by the spiral conveyer blade.

4 Claims, 1 Drawing Sheet

CONTINUOUS PHOTOCHEMICAL REACTOR

FIELD OF THE INVENTION

This invention relates to a continuous type photochemical reactor and, more particularly, an apparatus for continuously producing polymers by photochemical reactions or photopolymerizations.

BACKGROUND OF THE INVENTION

So far, photochemical reactions are generally carried out by a batch production system in which a batch of a reaction mixture such as, for example, a mixture of vinyl monomers and additives is put into a reaction vessel and then irradiated with ultraviolet light from a plurality of ultraviolet lamps arranged in the vessel, while being stirred by a stirrer coaxially arranged in the center of the vessel.

Since the rate of photochemical reaction depends on the intensity of ultraviolet light, the reaction of monomers is enhanced in an area close to the outer walls of the lamps and the reaction mixture is increased in viscosity of with increase of polymerization degree. the viscosity of the reaction product may vary within the range of from 1000 to 150,000 cps. If the viscosity is increased to 100,000 cps and above, the stirring of the reaction mixture takes place only around the stirrer, resulting in a local photopolymerization, which in turn results in production of polymers with non-uniform molecular weights. This problem becomes large with increase in the size of the reaction vessel.

SUMMARY OF THE INVENTION

It is therefore an object of the present invention to provide a photochemical reactor which makes it possible to continuously produce polymers with uniform molecular weight.

According to the present invention, there is provided a continuous photochemical reactor comprising a rotatable cylindrical reaction vessel provided at its one end with an inlet for reaction mixture and at the other end with an opening, a lid body for closing said opening of the reaction vessel, said lid body having an outlet for reaction products, a lamp mounted on the lid body and coaxially arranged in the reaction vessel, a driving means for rotating said reaction vessel around its axis, said reaction vessel being provided at its inner wall with a spiral conveyer blade so that the inner edge of the blade is arranged close to the outer wall of the lamp.

In a preferred embodiment, the lamp is composed of an ultraviolet lamp provided with a water jacket to prevent it from over heating.

If the photopolymerization takes a long time, it is preferred to use a reaction vessel with a long length. Alternatively, the continuous photochemical reactor is composed of two or more reaction vessels having a certain length of reaction vessels and being connected in series.

The invention will be further apparent from the following description in conjunction with the accompanying drawing which shows, by way of example only, a preferred embodiment thereof.

DESCRIPTION OF THE PREFERRED EMBODIMENT

Figure 1:
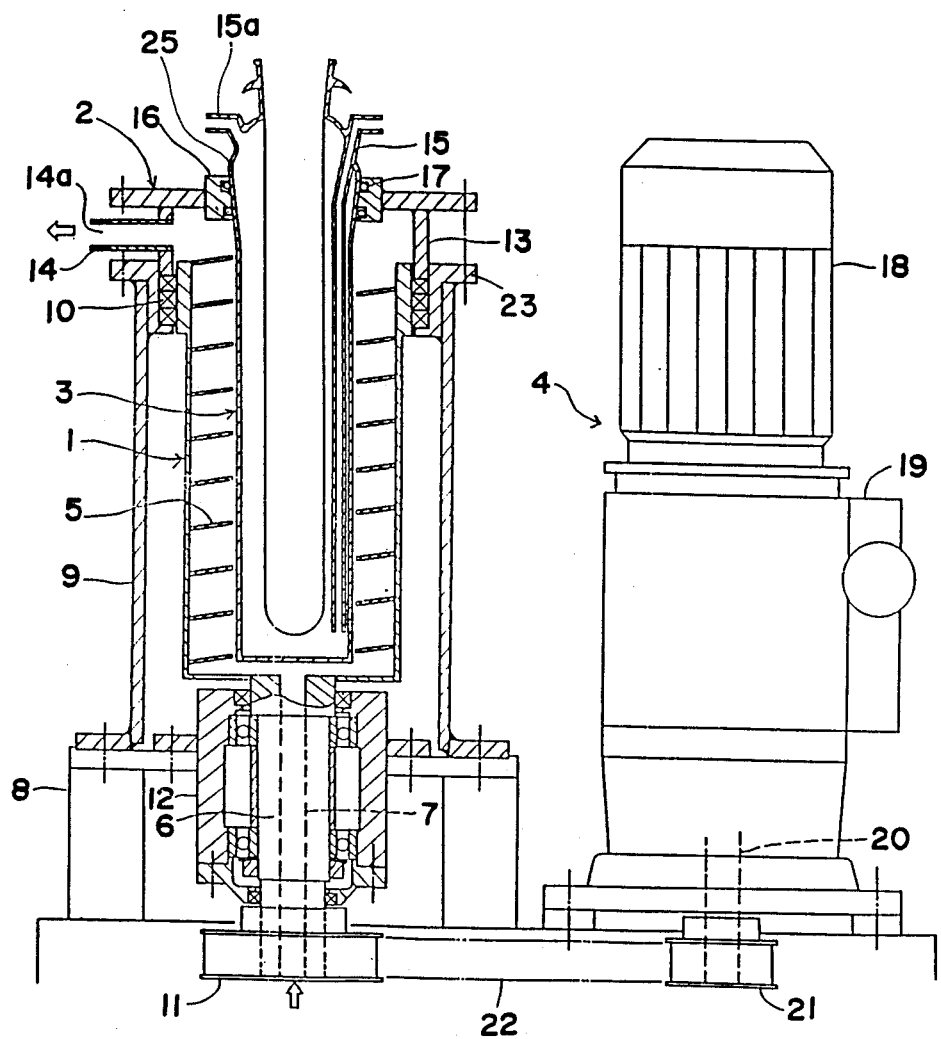
FIG. 1 is a partial cutaway side view of a continuous photochemical reactor embodying the present invention.

Referring to FIG. 1, there is illustrated a continuous photochemical reactor according to the present invention which comprises a rotatable reaction vessel 1, a lid body 2, a lamp 3, and a driving means 4.

The reaction vessel 1 is composed of an open-topped hollow cylindrical body with a coaxial driving shaft 6 mounted on the bottom of the cylindrical body 1. A spiral conveyer blade 5 is coaxially arranged in the reaction vessel 1 and fixed to the inner wall of the reaction vessel 1. The reaction vessel 1 is rotatably mounted on a base frame 8 by a bearing 12 and housed in a casing 9. The upper part of the reaction vessel 1 is supported by a flanged sleeve 23 welded to the casing 9 to prevent it from oscillating motion. Arranged between the sleeve 23 and the reaction vessel 1 are packing rings 10.

The driving shaft 6 is provided with an inlet passage 7 extending in its axial direction to supply a reaction mixture to the vessel 1. The reaction mixture is supplied to the driving shaft 6 through a pipe line (not shown) connected thereto by a rotary joint (not shown).

The lid body 2 is of a flanged cylindrical form and is joined to the casing 9 by the flanged joint. A barrel 13 of the lid body 2 is fitted in the flanged sleeve 23 of the casing 9 to close the reaction vessel 1 and to provide a seal against the packing rings 10. The barrel 13 is provided with a discharge pipe 14 to form an outlet passage 14a extending in the direction perpendicular to the axis of the barrel 13.

The lamp 3 is an ultraviolet lamp with a water jacket 25 made of a light transmission material and provided with a cooling pipe 15. The lamp 3 is fixed to the lid body 2 by a bushing 16 and extends into the reaction vessel 1 from the open end. Arranged between the lamp 3 and bushing 16 are packing rings 17. The lamp 3 is generally so designed that its diameter is slightly smaller than that of an internal diameter of the conveyer blade 5 to form a gap between the outer wall of the lamp 3 and inner edge of the conveyer blade 5. The gap between the lamp 3 and the blade 5 may vary with the size of the reactor and is generally determined within the range of from 2 to 30 mm.

The driving means 4 comprises an electric motor 18 and a stepless variable speed gearing 19 and is mounted on the base frame 8. A transmission shaft 20 of the gearing 19 is connected to the driving shaft 6 by a pair of pulleys 11 and 21 and a transmission belt 22 to rotate the reaction vessel 1 about its axis.

In use, the lamp 3 is turned on to irradiate ultraviolet light to the reaction mixture passing through the reaction vessel 1, and cooling water is introduced into the water jacket 25 through the pipe 15 and discharged through an outlet 15a. The reaction mixture is continuously supplied to the reaction vessel 1 from the bottom through the driving shaft 6 and the reaction vessel 1 is rotated about its axis together with the spiral conveyer blade 5 by the action of the driving means 4. The reaction mixture enters into the reaction vessel 1 and flows upwardly under the rotating motion of the spiral conveyer 5 about the lamp 3. At the same time, the reaction mixture is stirred by the conveyer blade 5 and subjected to ultraviolet light from the lamp 3 to cause the photopolymerization. The reaction products are discharged from the reaction vessel 1 through the discharge pipe 14.

The rate of rotation of the reaction vessel 1 is determined by considering viscosities of the reaction mixture and produced polymers. If the reaction mixture has a low viscosity, they are apt to flow down through the gap between the lamp 3 and inner edge of the spiral conveyer 5. It is therefore required to speed up the flow rate of the reaction mixture by increasing the rate of rotation of the reaction vessel 1. In this case, the flow of the reaction mixture may be assisted by application of pressure from a feeding pump. If the reaction mixture has a high viscosity, the reaction vessel may be rotated at a low rate since the downward flow of the reaction mixture scarcely takes place.

Since the rate of photopolymerization depends on the intensity of the light, the rate of reaction in the area close to the outer surface of the lamp 3 is faster than that in the area closed to the inner surface of the reaction vessel 1. Thus, it is essential to stir the reaction mixture homogeneously to prevent it from a local polymerization which causes local increase in the viscosity. In the above device, the spiral conveyer blade 5 is rotated around the lamp 3 so that the reaction mixture is upwardly and spirally moved about the lamp and stirred uniformly by the rotating spiral conveyer blade 5. Accordingly, local photopolymerization of the reaction mixture is prevented, thus making it possible to produce polymers with uniform molecular weight.

The photochemical reaction is continuously carried out in the photochemical reactor only by feeding the reaction mixture, thus making it possible to use a small volume of the photochemical reactor. If the photopolymerization takes a long time, it is possible to use a long length of a continuous photochemical reactor to extend the time of photopolymerization. Alternatively, it is possible to use two or more photochemical reactors connected in series. In the latter case, the reaction mixture polymerized in the first reactor is supplied to the next photochemical reactor, which is connected to the first photochemical reactor.

In the above embodiment, the photochemical reactor is composed of a reaction vessel with a vertical rotating axis, but may be composed of a reaction vessel with a horizontal rotating axis. In the latter, it is preferred to support the lamp at both its ends.

EXAMPLE 1

Using a commercially available ultraviolet lamp (Rating: 500 W, Wave lengths: 280 to 800 nm, Main wave length: 303 and 313 mn) there was assembled a continuous photochemical reactor as shown in FIG. 1 and a reaction mixture was prepared by mixing butyl acrylate and gamma-mercaptopropyl methyldimethoxysilane in the weight ratio of 6:0.18.

The resultant reaction mixture was supplied to the reactor by a pump through the driving shaft to produce vinyl polymer. The continuous photochemical reactor was operated under the following conditions.

| | |
|---|---|
| Supply flow rate of reaction mixture | 13 to 20 ml/min |
| Rate of rotation of reaction vessel | 15 rpm |
| Time of polymerization | 5 hours |
| Flow time of polymer | 4 hours |
| Temperature of the mixture | 50° C. |
| Discharge of polymer | 15 g/min |

The resultant polymer was subject to measurement of various characteristics. Results are as follows:

| | |
|---|---|
| Number average molecular weight | 4000 |
| Viscosity | 2800 cps |
| Conversion efficiency | 87% |

EXAMPLE 2

A reaction mixture was prepared by mixing 8 Kg of ethyl acrylate and 0.04 Kg of gamma-mercaptopropyl methyl dimethoxysilane and then supplied to the continuous photochemical reactor used in Example 1 to produce polymers. The reactor was operated under the following conditions:

| | |
|---|---|
| Supply flow rate of reaction mixture | 13 to 20 ml/min |
| Rate of rotation of reaction vessel | 23 rpm |
| Time of polymerization | 7 hours |
| Discharge time of polymer | 6 hours |
| Temperature of the mixture | 55° C. |
| Discharge of polymer | 14 g/min |

The resultant polymer was subjected to measurement of various characteristics. Results are as follows:

| | |
|---|---|
| Number average molecular weight | 20000 |
| Viscosity | 1,050,000 cps |
| Conversion efficiency | 90% |

EXAMPLE 3

A reaction mixture was prepared by mixing 4.25 Kg of butyl acrylate, 0.5 Kg of bis(methyl dimethoxysilyl propyl) disulfide, and 0.75 Kg of dioctyl phthalate, and then supplied to the continuous photochemical reactor used in Example 1 to produce polymers. The reactor was operated under the following conditions:

| | |
|---|---|
| Supply flow rate of reaction mixture | 13 to 20 ml/min |
| Rate of rotation of reaction vessel | 23 rpm |
| Time of polymerization | 7 hours |
| Discharge time of polymer | 6 hours |
| Temperature of the mixture | 50° C |
| Discharge of polymer | 10 g/min |

The resultant polymer was subjected to measurement of various characteristics. Results are as follows:

| | |
|---|---|
| Number average molecular weight | 12,500 |
| Viscosity | 700,000 cps |
| Conversion efficiency | 87% |

What is claimed is:

1. A continuous photochemical reactor system comprising:
   a cylindrical reaction vessel, rotatable around a central longitudinal axis, having an open upper end, an inner wall, and an inlet for reaction mixture at a lower end thereof;
   a lid body for closing said upper end of said reaction vessel, said lid body being provided with a central opening and an outlet for reaction products;
   a lamp assembly having an outer wall and being mounted on said lid body in said central opening and coaxially arranged with the reaction vessel;
   a driving means for rotating said reaction vessel about its central longitudinal axis; and a spiral conveyer blade arranged coaxially within said reaction vessel so as to surround the lamp assembly, and fixed at its outer edge to the inner wall of said reaction vessel, an inner edge of the blade being arranged close to said outer wall of the lamp assembly to form a gap of from 2 to 30 mm between said outer wall of the lamp assembly and said inner edge of the blade.

2. A continuous photochemical reactor system according to claim 1, wherein said lamp assembly comprises a water-cooled ultraviolet lamp provided with a water jacket, said water jacket forming said outer wall of the lamp.

3. A continuous photochemical reactor system according to claim 1, comprising a plurality of said reaction vessels and further comprising means for operatively connecting said reaction vessels in series.

4. A continuous photochemical reactor system according to claim 1, wherein the reaction vessel is provided with a casing for housing the reaction vessel, said casing having at its upper part a flanged sleeve for supporting said reaction vessel, said lid body being joined to said sleeve.

* * * * *